Patented Mar. 22, 1932

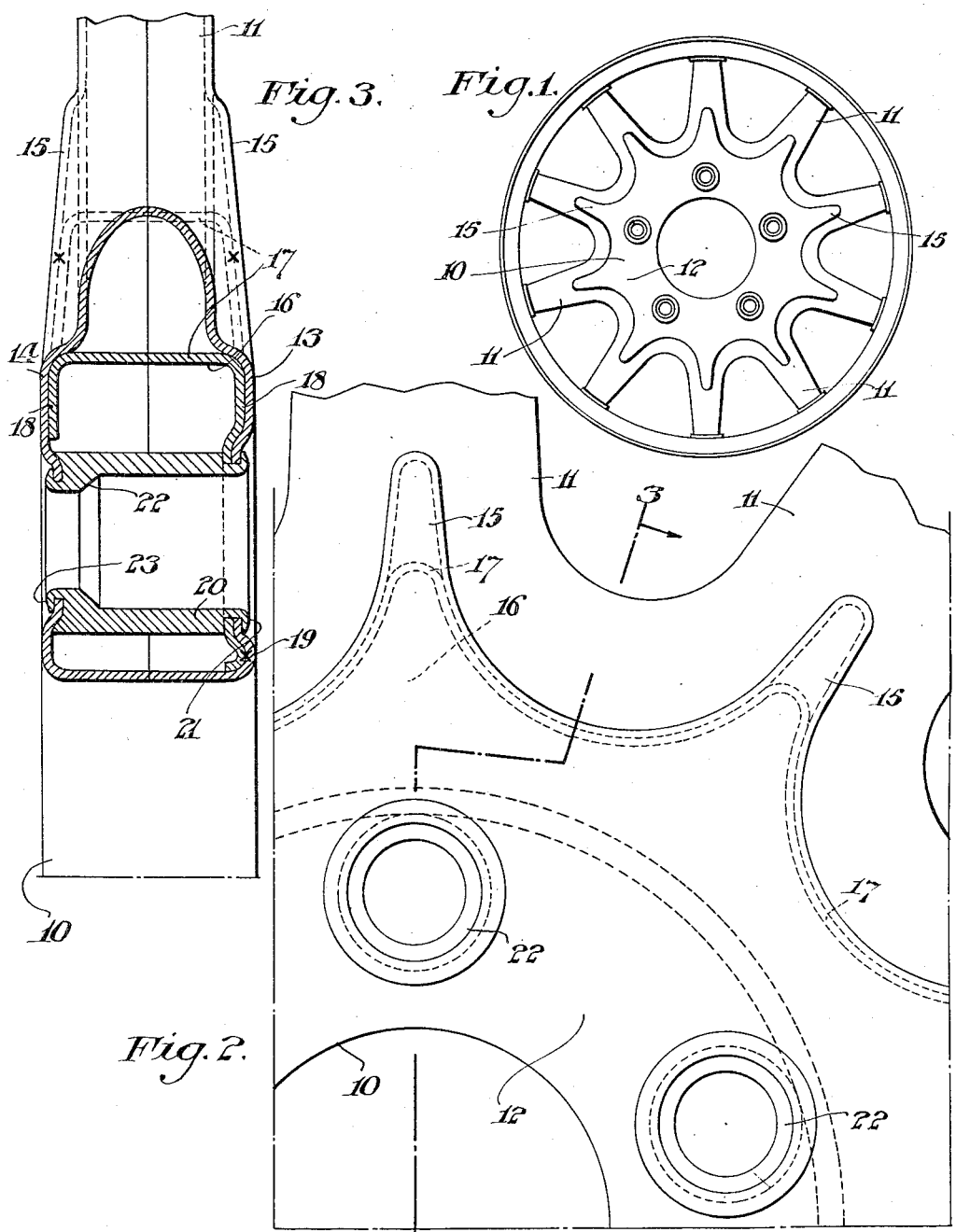

1,850,344

UNITED STATES PATENT OFFICE

CAROLUS L. EKSERGIAN, OF DETROIT, MICHIGAN, ASSIGNOR TO BUDD WHEEL COMPANY, OF PHILADELPHIA, PENNSYLVANIA, A CORPORATION OF PENNSYLVANIA

REENFORCED STEEL WHEEL

Application filed May 29, 1930. Serial No. 457,091.

My invention relates to the art of wheels, and it has been my object to improve the artillery steel wheel of the prior art by strengthening the central portion thereof in the region of the bolt holes. Experience has shown that this is the part of an artillery wheel of the steel type which is most likely to fail in service. I have therefore reenforced the wheel at this point to resist the unusual stresses caused by the driving studs. Certain aspects of the invention are not limited to artillery wheels in their applicability, and I do not therefore wish to be altogether limited to this art.

In the drawings,

Fig. 1 is a side elevation of my improved wheel,

Fig. 2 is an enlarged view similar to Fig. 1 showing certain details of the construction, and Fig. 3 is a sectional view along the line 3—3 of Fig. 2.

Referring to the drawings by reference characters, 10 denotes my improved wheel having spoke portions 11 and nave portions 12. In the manufacture of such a wheel the parts are formed in two axially divided duplicate stampings, each comprising a nave portion and spoke portions which are thereafter integrally joined together to form the complete wheel. The wheel is formed with a series of outwardly extending ribs 15 extending substantially radially through the portions of the nave and spokes of the wheel. These ribs are preferably connected at their bases, thereby forming a continuous annular rib. A flanged annular reenforcing ring 16 comprising a main body 17 and flanges 18 is secured in position between the two halves of the wheel and is located by the ribs 15, peripheral portions of the ring extending within the base of each of the ribs and being snugly fitted therein. The ribs thus position the reenforcing ring annularly and radially. This reenforcing ring is provided with a pair of radially extending flanges 18 of substantial expanse, at least one of these flanges being preferably welded to the wheel body as indicated at 19.

In the manufacture of my improved wheel the reenforcing ring is preferably welded to the inside of one of the stampings 13 which is destined to constitute the wheel, and the halves 13 and 14 of the wheel are thereafter integrally joined to each other by welding. If desired, the reenforcing ring may likewise be formed in axially divided halves which are united to the respective wheel halves by welding, before the final welding of the wheel halves to each other, the halves of the annular ring being welded to each other during the final welding of the wheel halves. Reenforcing thimbles 20 extend through the bolt hole region of the wheels and are provided with outer flanges 21 which are crimped over the thimble, wheel and ring. These thimbles are also provided with conical seats 22 adapted to receive the securing nuts and inner flanges 23 adapted to be crimped over the inner stamping. It will be seen that I have provided a reenforcing ring which has portions snugly fitting within the ribbed parts of the wheel and which has a flange of substantial extent reenforcing the outer half of the nave of the wheel. I thereby obtain a wheel which is strengthened not only by reason of the ribbing and the nesting of the reenforcing ring within the ribbing, but is further strengthened by being provided with a double thickness of metal at its most vulnerable point.

Modifications will be obvious to those skilled in the art and I do not, therefore, wish to be limited except by the generic spirit of my invention as interpreted in the light of the prior art and the sub-joined claims.

What I claim is:

1. A wheel nave including a pair of spaced metal side members, an inwardly projecting rib extending circumferentially of said nave and having radially extending portions, and a flanged annular ring extending across said nave portion and having portions extending radially complementally to portions of said rib and positioned thereby.

2. A wheel nave including a pair of spaced metal side members, an inwardly projecting rib extending circumferentially of said nave and having radially extending portions, a flanged annular ring extending across said nave portion and having portions extending radially complementally to portions of said rib and positioned thereby, said nave and the flange of said ring being provided with registering bolt receiving openings, and a plurality of shouldered reenforcing thimbles passing through said openings, an outer end of each of said thimbles being upset against its shouldered portion to clamp the nave portion and flange together.

In testimony whereof I hereunto affix my signature.

CAROLUS L. EKSERGIAN.